US008599734B1

(12) United States Patent
Ram et al.

(10) Patent No.: US 8,599,734 B1
(45) Date of Patent: Dec. 3, 2013

(54) TCP PROXY ACKNOWLEDGEMENTS

(75) Inventors: Mohan Ram, Bangalore (IN); Vaduvur Bharghavan, Morgan Hill, CA (US); Saravanan Balasubramanian, Sunnyvale, CA (US)

(73) Assignee: Meru Networks, Sunnyvale, CA (US)

( * ) Notice: Subject to any disclaimer, the term of this patent is extended or adjusted under 35 U.S.C. 154(b) by 1004 days.

(21) Appl. No.: 12/255,901

(22) Filed: Oct. 22, 2008

Related U.S. Application Data

(63) Continuation of application No. 12/241,524, filed on Sep. 30, 2008, now abandoned.

(51) Int. Cl.
   *H04H 20/71* (2008.01)
   *H04L 1/18* (2006.01)
   *G06F 17/00* (2006.01)

(52) U.S. Cl.
   USPC .............................. 370/312; 714/749; 726/12

(58) Field of Classification Search
   None
   See application file for complete search history.

(56) References Cited

U.S. PATENT DOCUMENTS

| 5,038,151 | A | 8/1991 | Kaminski |
| 5,337,397 | A | 8/1994 | Lebby et al. |
| 5,966,094 | A | 10/1999 | Ward et al. |
| 6,658,047 | B1 | 12/2003 | Komulainen et al. |
| 6,760,318 | B1 | 7/2004 | Bims |
| 6,788,658 | B1 | 9/2004 | Bims |
| 6,839,038 | B2 | 1/2005 | Weinstein |
| 6,894,649 | B2 | 5/2005 | Ostervall |
| 6,933,909 | B2 | 8/2005 | Theobold |
| 6,954,177 | B2 | 10/2005 | Channabasappa et al. |
| 6,978,158 | B2 | 12/2005 | Ghavami |
| 7,016,347 | B2 * | 3/2006 | De Oliveira ................. 370/389 |
| 7,237,007 | B2 * | 6/2007 | Kamath et al. ................. 709/206 |
| 7,319,685 | B2 | 1/2008 | Kim et al. |
| 7,333,455 | B1 | 2/2008 | Bolt et al. |
| 7,359,362 | B2 | 4/2008 | King et al. |
| 7,423,963 | B2 * | 9/2008 | Lee .............................. 370/229 |
| 7,453,855 | B1 | 11/2008 | Madhow |
| 7,577,427 | B2 * | 8/2009 | Bicker et al. ................. 455/417 |
| 2003/0198305 | A1 | 10/2003 | Taylor et al. |
| 2005/0111405 | A1 | 5/2005 | Kanterakis |
| 2005/0152314 | A1 | 7/2005 | Sun et al. |
| 2006/0098616 | A1 * | 5/2006 | Kish et al. ..................... 370/338 |
| 2010/0091759 | A1 * | 4/2010 | Stahl et al. ..................... 370/347 |

OTHER PUBLICATIONS

Habib et al "Multi-antenna techniques for OFDM based WLAN." Proceedings of First International Conference on Next-Generation Wireless Systems, Jan. 2006, pp. 186-190.

(Continued)

*Primary Examiner* — Afshawn Towfighi
(74) *Attorney, Agent, or Firm* — Law Office of Dorian Cartwright

(57) ABSTRACT

A system and method enable the transmission of messages between a source device and a wireless station. A first message is received at an access point from the source device. The access point transmits the first message to the wireless station and stores a copy of the first message in a memory. The access point receives an acknowledgement message from the wireless station and transmits a proxy acknowledgement message to the source device. The access point transmits a control message to the source device to limit the number or size of additional messages sent from the source device based on a number or size of messages currently stored in the memory and a maximum number or size of messages that can be stored in the memory.

15 Claims, 4 Drawing Sheets

(56) References Cited

OTHER PUBLICATIONS

Kitahara et al. "A base station adaptive antenna for downlink transmission in a DS-CDMA system." IEEE 51st Vehicular Technology Conference Proceedings, 2000. (Abstract).

Mahler et al. "Design and optimisation of an antenna array for WiMAX base stations." IEEE/ACES International Conference on Wireless Communications and Applied Computational Electromagnetics, 2005. (Abstract).

Miaris et al. "On the base stations antenna system design for mobile communications." Electrical Engineering, 2006, pp. 157-163, vol. 88.

Miura et al. "Study of array pattern tuning method using hybrid genetic algorithms for figure-8 satellite's earth station antenna." Asia-Pacific Microwave Conference Proceedings, 2000. (Abstract).

Ponnapalli et al. "Design and packaging of antennas for wireless systems." Proceedings of Electrical Performance of Electrical Packaging, 1995. (Abstract).

Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003. (Abstract).

\* cited by examiner

TCP PROXY ACKNOWLEDGEMENTS

RELATED APPLICATIONS

This application claims priority from U.S. application Ser. No. 12/241,524, of the same title, filed Sep. 30, 2008, in the names of the same inventors, which is hereby incorporated by reference as if fully set forth herein.

BACKGROUND OF THE DESCRIPTION

In wireless communication, devices send and receive messages without being physically coupled. Wireless devices can comprise portable computers, telephones, location sensors (such as those using Global Positioning Systems), and the like. Portable computers with wireless communication capability can be coupled to a wireless and/or wireline communication network, such as the Internet. Wireless networking devices require the use of underlying technology that deals with radio frequencies as well as data transmission. The most widely used set of standards includes Institute of Electrical and Electronic Engineers (IEEE) standard 802.11 (including 802.11a, 11b, 11g, and 11n), and variants thereof.

Reference models, such as the Open System Interconnection (OSI) reference model, define a layered architecture that standardizes a set of protocol levels for exchanging data between computing devices through a communication network. The OSI reference model splits the communication process into seven hierarchical layers.

During an exchange of data between a source device and a receiving device, the source device retrieves data from an application in an upper most layer and passes the application data to a Transmission Control Protocol (TCP) layer in the architecture of the source device. For example, the TCP layer receives a stream of bytes from the application layer, destined for the receiving device. The TCP layer assembles the stream of bytes into TCP messages, or packets (e.g., approximately 1500 bytes per packet) for transmission to the receiving device 104. In the process of assembling the message, header information is pre-pended to the data in the form of a TCP layer header, such as a destination address, an originating address, and a sequence number. When TCP messages arrive at the receiving device, the TCP layer at the receiving site uses the sequence numbers to reconstruct the correct order of the data.

According to the IEEE 802.11 standards, wireless devices seek out and select "access points" (herein sometimes called "AP's"), each of which is coupled to at least one computing device for data communication. AP's might be coupled using a wireline communication link, a wireless communication link, or otherwise. A wireless device coupled to an AP can communicate data to another wireless device that is also coupled to that AP and can, for example, request data from a source device, such as a server in a communication network. In this example, the source device can respond to the request by generating and sending one or more TCP messages.

When a TCP message is sent from a source device to a wireless device via the AP, the wireless device responds to the AP with a media access control level (MAC) acknowledgement (ACK) message, to indicate that the TCP message was received at a MAC layer of the wireless device without error. Some time later, the wireless device generates a TCP ACK message to the sender, to indicate that the TCP message was received at a TCP layer of the wireless device without error. The AP receives the TCP ACK message and transmits the TCP ACK message to the source device, also at the TCP layer.

If the source device does not receive the TCP ACK message within a selected amount of time, it retransmits that TCP message to the destination. It may take awhile for the wireless device to generate the ACK message and transmit the TCP ACK message to the source device via the AP. If the source device stops sending messages until the TCP ACK message is received, valuable transmission time that could be used to send additional TCP messages would be lost.

Some systems reduce the amount of time lost by enabling the source device to continue sending TCP messages until its sending buffer is full. When the buffer is full, the source device stops sending messages until at least one corresponding ACK message is received. If the source device stops sending messages when its buffer is full, there would still be some amount of time that is lost which could have been used to send other TCP messages.

SUMMARY OF THE DESCRIPTION

According to one aspect, a method communicates messages between a source device and at least one wireless station via an access point. The method includes receiving a first plurality of messages at the access point from the source device. The method also includes transmitting each of the first plurality of messages from the access point to the wireless station. The method also includes storing a copy of each of the first plurality of messages transmitted to the wireless station in a memory at the access point. The memory is configured to store a maximum number of messages. The method also includes receiving a first corresponding acknowledgement message at the access point from the wireless station for each of the first plurality of messages successfully received at the wireless station. The method also includes determining an amount of storage space available on the memory as a function of a current number of stored messages and the maximum number. The method also includes transmitting a proxy acknowledgement message from the access point to the source device in response to each first corresponding acknowledgement message. The proxy acknowledgement message indicates a size for one or more additional messages that can be received at the access point based on the amount of available storage space.

According to another aspect, a messaging application encoded on a computer-readable medium communicates messages via an access point. The messaging application is executable by a processor at the access point. The messaging application includes a transmission module that receives a first plurality of messages from a source device. The transmission module also transmits the first plurality of messages to at least one wireless station. The messaging application also includes a proxy generation module that receives a first corresponding acknowledgement message from the wireless station for each of the first plurality of messages successfully received at the wireless station. The proxy generation module also transmits a proxy acknowledgement message to the source device in response to each first corresponding acknowledgement message. The proxy acknowledgement message indicates a size for one or more additional messages that can be received at the access point based on an amount of available storage space. The messaging application also includes a storage module that stores a copy of each of the first plurality of messages transmitted to the wireless station in a buffer at the access point. The buffer stores a maximum number of messages. The messaging application also includes an acknowledgement message management module that determines the amount of storage space available in the buffer as a function of a current number of messages stored in the buffer and the maximum number.

According to another aspect, a system communicates messages in a communication network. The system includes an access point that receives a first plurality of messages from a source device and that transmits the first plurality of messages to at least one wireless station. The access point includes a processor configured to execute a messaging application. The messaging application includes a memory configured to store a maximum number of messages. The messaging application also includes a transmission module that transmits a first plurality of messages to a wireless station, the first plurality of messages received from a source device. The messaging application also includes a proxy generation module receives a first corresponding acknowledgement message from the wireless station for each of the first plurality of messages. The proxy generation module also transmits a proxy acknowledgement message to the source device for each first corresponding acknowledgement message. Each proxy acknowledgement message indicates a size of messages that can be received at the access point based on the available amount of storage space. The size of the messages includes a number of messages or a total data amount for the messages. The messaging application also includes a storage module that stores a copy of each of the first plurality of messages transmitted to the wireless station in the memory. The messaging application also includes an acknowledgement message management module that determines the amount of storage space available in the memory as a function of a current number of messages stored in the memory and the maximum number.

According to another aspect, a method communicates messages between a source device and a wireless station via an access point. The method involves receiving a first message at the access point from the source device. The method also involves transmitting the first message from the access point to the wireless station. The method also involves receiving a corresponding acknowledgement message at the access point from the wireless station when the first message is successfully received at the wireless station. The method also involves storing a copy of the first message in a buffer at the access point. The buffer configured to store a maximum number of messages. The method also involves determining a total number of messages currently stored in the buffer and calculating an amount of available storage space in the buffer by subtracting the total number of messages from the maximum number. The method also involves transmitting a proxy acknowledgement message from the access point to the source device in response to the corresponding acknowledgement message. The proxy acknowledgement message indicates the access point can receive additional messages up to the amount of available storage space.

According to another aspect, a method communicates messages between a source device and a wireless station via an access point. The method involves receiving a first plurality of messages at the access point from the source device. The method also involves transmitting each of the first plurality of messages from the access point to the wireless station. The method also involves storing a copy of each of the first plurality of messages transmitted to the wireless station in a memory at the access point. The memory stores a maximum number of messages. The method also involves receiving a first corresponding acknowledgement message at the access point from the wireless station for each of the first plurality of messages successfully received at the wireless station. The method also involves transmitting a proxy acknowledgement message from the access point to the source device in response to each first corresponding acknowledgement message. The proxy acknowledgement message indicates a maximum size for one or more additional messages that can be received at the access point based on the amount of available storage space.

According to another aspect, a method communicates messages between a source device and a wireless station via an access point. The method involves receiving a number of messages at the access point from the source device. The method also involves transmitting each of the number of messages from the access point to the wireless station. The method also involves storing a copy of each of the number of messages transmitted to the wireless station in a memory at the access point. The method also involves limiting a maximum size for one or more additional messages the source device can send to the access point to a size of the memory minus the number of messages.

According to another aspect, a messaging application encoded on a computer-readable medium communicates messages via an access point. The messaging application is executable by a processor at the access point. The messaging application includes a transmission module that receives a first plurality of messages from a source device. The transmission module also transmits the first plurality of messages to at least one wireless station. The messaging application also includes a proxy generation module that transmits a proxy acknowledgement message to the source device. The proxy acknowledgement message indicates a size for one or more additional messages that can be received at the access point based on an amount of available storage space. The messaging application also includes a storage module that stores a copy of each of the first plurality of messages transmitted to the wireless station in a buffer at the access point. The buffer stores a maximum number of messages. The messaging application also includes an acknowledgement message management module that determines the amount of storage space available in the buffer as a function of a current number of messages stored in the buffer and the maximum number.

According to another aspect, a method communicates messages between a source device and a wireless station via an access point. The method involves receiving a first message at the access point from the source device. The method also involves transmitting the first message from the access point to the wireless station. The method also involves storing a copy of the first message in a buffer at the access point, the buffer configured to store a maximum number of messages. The method also involves determining a total number of messages currently stored in the buffer and calculating an amount of available storage space e in the buffer by subtracting the total number of messages from the maximum number. The method also involves transmitting a proxy acknowledgement message from the access point to the source device. The proxy acknowledgement message indicates the access point can receive additional messages up to the amount of available storage space.

DETAILED DESCRIPTION

Aspects of the TCP acknowledgement systems and methods described herein enable the ability to generate proxy TCP acknowledgements at an access point (AP). For example, instead of waiting for a wireless device to build a TCP ACK (upper layer ACK) to send to the AP at an upper TCP layer protocol, the AP builds a proxy TCP ACK based on the MAC ACK (lower layer ACK) generated at the lower MAC layer protocol. As another example, the AP builds the proxy TCP ACK in response to a TCP message received from a source device. Because the source device does not wait for the wireless station to build a TCP ACK to transmit another TCP message, the speed at which additional TCP messages are transmitted can be increased.

After transmitting a series of TCP messages to a wireless station, it is possible that the AP will receive a corresponding TCP ACK for some of the transmitted TCP messages, but not receive a corresponding TCP ACK for other TCP messages. This situation may arise, for example, when TCP messages are received at the wireless station but are discarded at or above the MAC layer, such as due to TCP collisions at the wireless station or other errors, though other example might exist. Missing TCP ACKs are sometimes referred to herein as "holes," and can be an indication that, while the wireless device did receive data and acknowledge it at the MAC layer, that data did not make it to successful reception at the TCP layer at the wireless station. However, because the source device can continue to send additional TCP messages in response to received proxy TCP ACKs, the AP needs the ability to detect missing TCP ACKs and retransmit corresponding TCP messages so that data will not be lost at the TCP layer of the wireless station.

The present invention detects missing TCP ACKs and manages the number of additional TCP messages that can be sent from the source device. The present invention also manages the re-transmission of TCP messages from the AP to the wireless station based on detected missing TCP ACKs.

In other aspects, the AP detects missing TCP ACKs for an aggregate message. As explained in more detail below, the AP can aggregate multiple TCP messages into an aggregate message and transmit the aggregate message to a wireless station. The present invention detects missing TCP ACKs associated with TCP messages included in the aggregate message and manages the number of additional TCP messages that are allowed to be sent from the source device in response to the detected missing TCP ACKs.

FIG. 1

Figure 1:
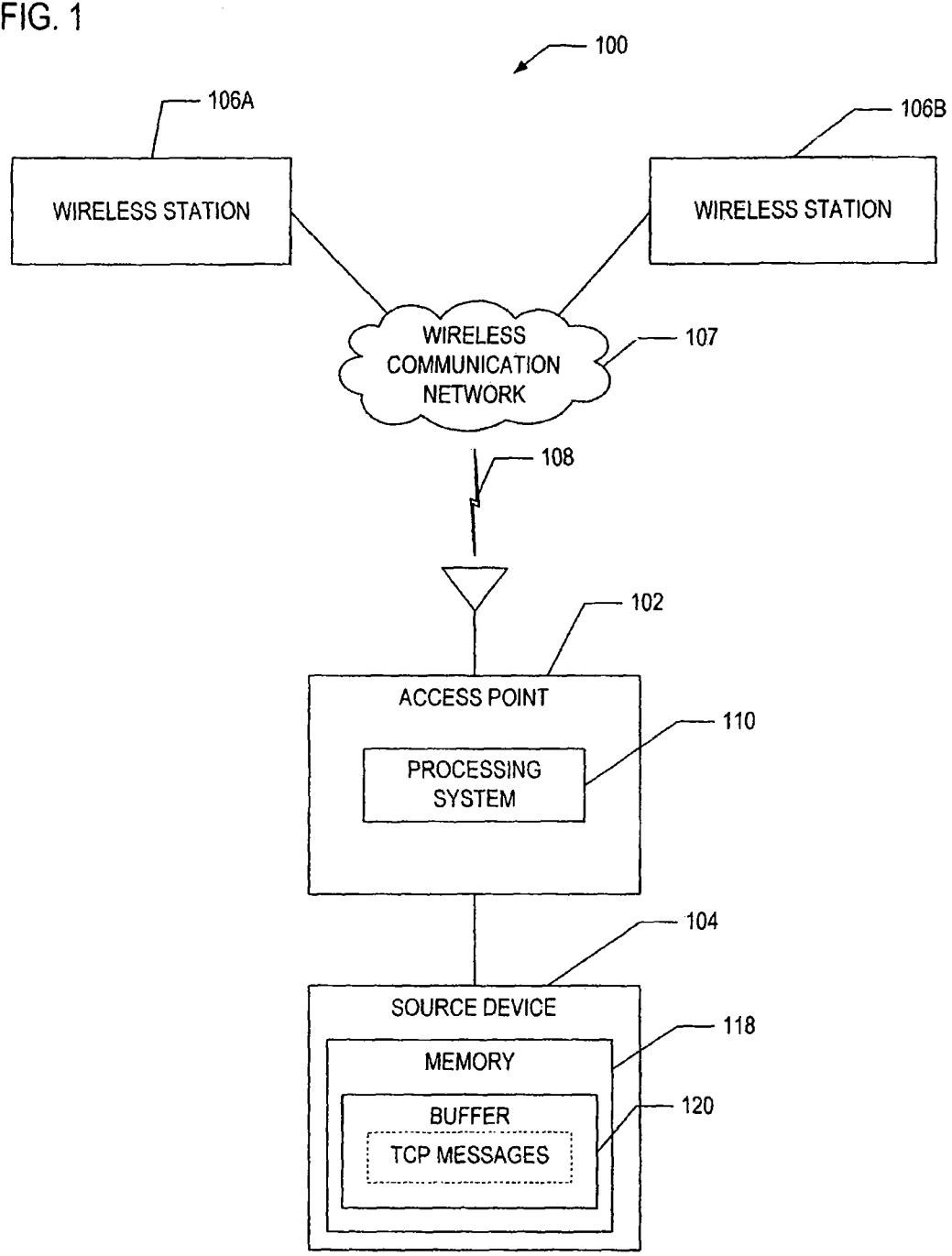
FIG. 1 illustrates components of a wireless communication management system according to one aspect of the invention.

FIG. 1 illustrates components of a wireless communication management system according to one aspect of the invention.

FIG. 1 is a block diagram of an exemplary wireless communication management system (CMS) 100 according to an aspect of the present invention. The CMS 100 includes an access point (AP) 102 for communicating data between a source device 104 and one or more wireless stations, such as wireless stations 106A, 106B via a wireless communication network 107. The phrase "access point" or the term "AP," and the like, refer to devices capable of wireless communication with wireless stations 106A, 106B and capable of wireless or wireline communication with other devices, such as the source device 104. The CMS 100 may include one or multiple wireless stations.

The source device 104 includes a computing device that generates data, such as a TCP message, that can be communicated across the communication network 107 to provide data or a service to one or more wireless stations 106A, 106B. The source device 104 can be connected to or be a part of another network (not shown), such as an Ethernet network or a packet switched network, and can comprise, for example, a router, a server, a personal computer, and/or another device.

Each wireless station 106A, 106B communicates via the wireless communication network 107. Each wireless station 106A, 106B includes, for example, a computing device that can transmit or receive messages or data via a wireless communication protocol. For example, the wireless stations 106A or 106B can include a router, a server, a personal computer (PC), or a mobile computer that has been configured for wireless communication. As another example, a wireless station 106A or 106B can be a telecommunication device, such as a cellular phone or a personal digital assistant. The wireless stations 106A, 106B generate a TCP acknowledgement (ACK) message in response to a TCP message successfully received at the TCP layer.

According to one aspect, the AP 102 connects to the source device 104 via a wireless or wireline connection, such as through a network connection or other connection. The AP 102 enables communication between the source device 104 and each wireless station 106A, 106B via a wireless communication link, as indicated by reference 108. For example, the AP 102 communicates a TCP message received from the source device 104 to the wireless stations 106A and/or 106B via the wireless link 108. The wireless communication link can be implemented, for example, using an 802.11 wireless network protocol.

The AP 102 has a processing system 110 that transmits a wireless communication with the received TCP messages across the wireless link 108. The AP 102 also formats the TCP message for transmission to the wireless station 106A and/or 106B via the wireless link 108. For example, the processing system 110 converts or encapsulates the TCP message into an 802.11 data frame and transmits the data frame to the wireless station 106A and/or 106B.

According to an aspect of the CMS 100, the processing system 110 executes software, modules, and/or instructions to generate a proxy TCP ACK message to send to the source device 104. For example, instead of waiting for the wireless station 106A or 106B to generate the TCP ACK message, the processing system 110 generates a proxy TCP ACK message for transmission to the source device 104 based on a MAC ACK received from the wireless station 106A or 106B. The proxy TCP ACK message is sent to the source device 104 to inform the source device 104 that the TCP message was successfully received at the wireless station 106A or 106B.

The source device 104 maintains a copy of each sent TCP message in a region of memory 118, such as a buffer 120. After receiving the proxy TCP ACK, the source device 104 can clear the corresponding message from its memory 118. In one example, the source device 104 sends 15 messages to the wireless station 106A and the source device 104 receives a corresponding proxy TCP ACK message for each of the first 13 TCP messages. In this example, the source device 104 clears the first 13 TCP messages from the buffer 120 in response to receiving the corresponding proxy TCP ACK messages and can send 13 additional TCP messages.

According to another aspect, the processing system 110 manages the number of additional TCP messages the source device 104 sends to the AP 102 based on TCP ACKs, or lack thereof, received from the wireless station 106A. For example, the processing system 110 determines a limit for the number of additional TCP messages that it will accept from the source device 104 and builds a proxy TCP ACK message that specifies this number. The AP 102 sends the proxy TCP ACK message specifying the number to the source device 104. After receiving the proxy TCP ACK message, the source device 104 identifies the limit and stops the transfer of additional TCP messages when the limit has been reached.

As another example, the processing system 110 determines an amount of available storage space in the memory 118, such as the buffer 120, for additional TCP messages that it will accept from the source device 104 and builds a proxy TCP ACK message that indicates the total size of one or more messages it can receive. The size of the messages corresponds to the amount of available storage space allocated for these messages. The AP 102 sends the proxy TCP ACK message specifying the total size of the messages it can receive or the amount of available storage space it has to the source device 104. After receiving the proxy TCP ACK message, the source device 104 identifies the size of one or more messages or the amount of available storage space and stops the transfer of additional TCP messages when size or the amount has been reached or would be exceeded. The processing system 110 tracks missing TCP ACKs for each TCP message.

According to another aspect, the processing system 110 manages the number of additional TCP messages the source device 104 sends to the AP 102 in response to TCP ACKs, or lack thereof, received from the wireless stations 106A and/or 106B in response to an aggregate message sent to one of the wireless stations 106A or 106B from the AP 102. For example, multiple TCP messages can be aggregated into a single aggregate message at the AP 102, and the same aggregate message can be sent to one of the wireless stations 106A or 106B. Aggregating TCP messages in this manner minimizes the risk of overloading the access point. In one example, the single aggregate message is an Aggregated MAC Protocol Data Unit (A-MPDU) message according to the IEEE 802.11n protocol. The processing system 110 determines the amount of available storage space it has for additional messages, informs the source device 104 of its space limitations, and tracks missing TCP ACKs corresponding to the aggregated messages and individual TCP messages within the aggregated message.

FIG. 2

Figure 2:
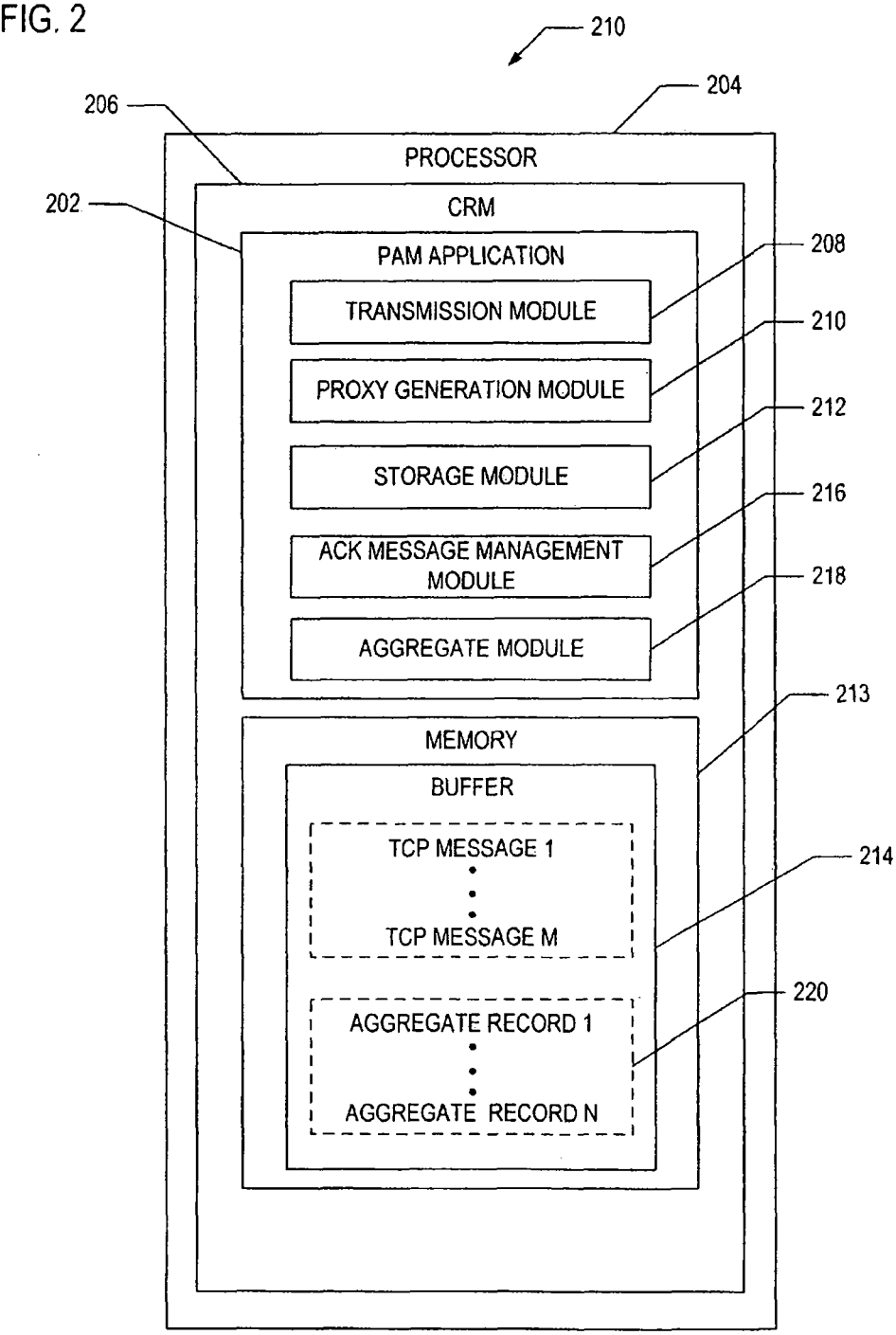
FIG. 2 illustrates an exemplary proxy acknowledgement messaging application according to one aspect of a wireless communication management system.

FIG. 2 illustrates an exemplary proxy acknowledgement messaging application according to one aspect of a wireless communication management system.

FIG. 2 illustrates an exemplary proxy acknowledgement messaging (PAM) application 202 according to one aspect of the wireless CMS 100. The PAM application 202 includes instructions or modules that enable the processing system 110 of the AP 102 to manage messaging between the source device 104 and each wireless station 106A, 106B. The processing system 110 includes a processor 204 and a computer readable medium 206 configured with the PAM application 202.

A transmission module 208 receives one or more messages from the source device 104 and transmits one or more TCP messages received from the source device 104 to the wireless station 106A or 106B in an appropriate format and/or protocol. For example, the transmission module 208 generates an 802.11 compliant wireless communication for the TCP message, which is transmitted to the wireless station 106A and/or 106B.

A proxy generation module 210 generates a proxy TCP ACK message and transmits the proxy TCP ACK message to the source device 104. According the one aspect, the proxy generation module 210 operates in a delayed proxy generation mode to generate a proxy TCP ACK message after it sends a TCP message to the wireless station 106A or 106B and receives a MAC ACK message received from the wireless station 106A or 106B. For example, the wireless station 106A or 106B acknowledges the successful reception of the wireless communication of the TCP message by generating a MAC ACK message that is transmitted to the AP 102. By operating in the delayed proxy generation mode, the AP 102 ensures reliability of TCP message delivery when a particular wireless station 106A or 106B can autonomously initiate communication with another AP (not shown).

The proxy generation module 210 generates additional proxy TCP ACK messages to transmit to the source device 104 while the source device is communicating with the wireless station 106A and/or 106B via the AP 102. For example, the source device 104 sends another TCP message, if available, in response to the proxy TCP ACK message. In response to receiving the other TCP message at the AP 102, the transmission module 208 generates another 802.11 compliant communication with the other TCP message to transmit to the wireless station 106A or 106B.

According to another aspect, the proxy generation module 210 operates in a fast proxy generation mode to generate a proxy TCP ACK message and transmit the proxy TCP ACK message to the source device 104 in response to the TCP message received from the source device 104. For example, rather than waiting to transmit the TCP message to a particular wireless station 106A and receive the MAC ACK message from that wireless station 106A, the proxy generation module 210 generates the proxy TCP ACK message as soon as the AP 102 receives the TCP message from the source device 104. As a result, in the fast proxy generation mode, proxy TCP ACK messages are generated much faster than other systems, which results in higher TCP message throughputs.

According to one aspect, when communication is first established between a particular wireless station 106A or 106B and the AP 102, the proxy generation module 210 operates in the fast proxy generation mode. The proxy generation module 210 continues to operates in a fast proxy generation mode until the AP 102 determines that the particular wireless station 106A or 106B that is currently communicating with the AP 102 will be handed-off for communicating with another AP (not shown). When such a hand-off condition is determined by the AP 102, the proxy generation module 210 automatically switches to the delayed proxy generation mode.

For example, the AP 102 receives a notification from an external device, such as a network controller (not shown), that an AP hand-off candidate exists for the wireless station 106A that is currently communicating with the AP 102. The network controller controls communications between multiple APs and wireless stations in a wireless network. The network controller may identify the AP hand-off candidate by collecting a received signal strength indicator (RSSI) value at the wireless station 106A from every AP in the network.

For the particular wireless station 106A, the hand-off candidate AP should have the greatest RSSI value of all the APs neighboring the AP 102 that is currently communicating with the wireless station 106A For example, if it is determined that the received RSSI value for a particular one of the AP's in the network is greater than the current AP's RSSI value by 3 dB for two consecutive periods of data collection, that particular AP is identified by the controller as the AP hand-off candidate. The controller then sends a notification of the detected hand-off condition to the current AP 102. The notification may indicate to the current AP 102 that the wireless station 106A may be handed off after some selected period of time (e.g., 3 seconds). The AP 102 then switches to the delayed proxy generation mode.

A storage module 212 stores a copy of each TCP message sent to the wireless station 106A and/or 106B in a region of memory 213, such as a buffer 214, of the AP 102. The buffer 214 has storage space for a maximum number of TCP messages (e.g., M TCP messages).

An ACK message management module 216 suppresses (i.e., does not forward) TCP ACK messages received from the wireless station 106A and/or 106B when a corresponding proxy TCP ACK message has already been generated. For example, when a proxy TCP ACK message has already been sent to the source device 104, it is unnecessary to send a corresponding actual TCP ACK message to the source device 104.

The ACK message management module 216 also stores TCP ACK messages received from the wireless station 106A and/or 106B in the buffer 214. It is possible that the AP 102 will not receive a corresponding TCP ACK for some of the TCP messages sent to the wireless station 106A and/or 106B. Missing TCP ACKs can be caused, for example, when a TCP message is received at the wireless station 106A and/or 106B but is discarded at or above the MAC layer. As explained above, missing TCP ACKs, or holes, can be an indication that the wireless station 106A and/or 106B did not receive a data stream or the entire data stream of a multi-component data stream required for reconstructing a particular document or service at the wireless station 106A and/or 106B.

The ACK message management module 216 detects missing TCP ACK messages, or holes. The transmission module 208 retransmits TCP messages corresponding to the missing TCP ACKs from the buffer 214 to the wireless station 106A and/or 106B. For example, if a TCP ACK message for a particular TCP message is not received within a selected amount of time, the transmission module 208 retransmits that particular TCP message to the wireless station 106A and/or 106B. For purposes of illustration, in one example, the buffer 214 stores a maximum of ten (10) TCP messages. Other examples exist. The ACK message management module 216 stores an indication that indicates whether an actual TCP ACK has been received for a corresponding TCP message. The indication may be a flag, yes, no, or some other indication. An example of a buffer 214 that includes seven (7) TCP messages and corresponding indications for the TCP ACKs is shown in Table 1.

TABLE 1

| TCP MESSAGES | TCP ACKs |
| --- | --- |
| TCP Message 1 | Yes |
| TCP Message 2 | Yes |
| TCP Message 3 | No |
| TCP Message 4 | Yes |
| TCP Message 5 | Yes |
| TCP Message 6 | Yes |
| TCP Message 7 | Yes |
| Empty | Empty |
| Empty | Empty |
| Empty | Empty |

In this example, the ACK message management module 216 detects a "hole" in the TCP ACKs that corresponds to TCP message 3.

The ACK message management module 216 determines the available storage space in the buffer 214 and instructs the source device 104 to limit the number of additional TCP messages that it sends to the AP 102 based on the available storage space. The available storage space can be determined based on total bytes of storage space available, total TCP message slots available, or some other indication of an available amount of storage.

According to one aspect, the proxy TCP ACK message generated by the proxy generation module 210 includes available storage space data. For example, the proxy TCP ACK message identifies the number of additional messages, the total size of one or more additional messages, the available memory in the buffer 214, the AP 102 can receive no messages, the AP 102 can receive messages, and other types of messages and/or data. The source device 104 limits the number of additional TCP messages its sends to the AP 102 based on the available storage space data. The ACK message management module 216 continually monitors the available storage space in the buffer 214 and the proxy TCP ACK messages sent to the source device 104 include the most recent available storage space data.

In one example, the ACK message management module 216 calculates a current number of available slots for storing additional TCP messages in the buffer 214. The proxy TCP ACK message is sent to the source device 104, which includes data identifying the current number of available slots. The source device 104 limits the number of additional TCP messages it sends to the AP 102 to the current number of available slots. According to one aspect, the current number of available slots corresponds to the buffer limit minus the number of TCP messages currently stored in the buffer 214. For the example shown in Table 1, the buffer 214 has seven TCP messages and one hole. The available slots are determined, for example, by subtracting the total number of TCP messages from the maximum number of storage slots, which is ten (10) in this example. Thus, there are three storage slots available. In this example, the proxy generation module 210 generates a proxy TCP ACK message that includes a current available slot value equal to three (3). In response, the source device 104 will not send more than three additional messages.

In another example, the buffer 214 has eight (8) TCP messages with corresponding TCP ACK indications, such as shown in Table 2. The indications can be flags or other indications.

TABLE 2

| TCP MESSAGES | TCP ACKs |
| --- | --- |
| TCP Message 1 | Yes |
| TCP Message 2 | Yes |
| TCP Message 3 | No |
| TCP Message 4 | Yes |
| TCP Message 5 | Yes |
| TCP Message 6 | Yes |
| TCP Message 7 | No |
| TCP Message 8 | Yes |
| Empty | Empty |
| Empty | Empty |

The total number of TCP messages currently stored in the memory is equal to eight (e.g., 8). Accordingly, the available slots are determined, for example, by subtracting the total number of currently stored TCP messages from the maximum number of storage slots, which is equal to ten (10). Thus, there are two storage slots available. The proxy generation module 210 generates a proxy TCP ACK message that includes a current available slot value equal to two (2). In response to the proxy TCP ACK message, the source device 104 will not send more than two (2) additional messages.

The transmission module 208 periodically retransmits the TCP message that corresponds to a hole detected by the ACK message management module 216. For the examples shown in Tables 1 and 2, the transmission module 208 retransmits TCP message 3 and TCP messages 3 and 7, respectively. If another MAC ACK message is received at the AP 102 based on a successfully retransmitted TCP message, the proxy generation module 210 does not generate another proxy TCP ACK message corresponding to the TCP message.

In the example of Table 1, after the ACK message management module 216 detects a TCP ACK that corresponds to the retransmitted TCP message 3, the ACK message management module 216 clears TCP messages 1-7 from the buffer 214. The next proxy TCP ACK message generated by the proxy generation module 210 includes a current available slot value equal to ten (10). In this instance, the total number of TCP messages currently stored in the memory is equal to zero. So, the current number of available slots is equal to the maximum number of storage slots, which is ten (10). In response, the source device 104 will not send more than ten additional messages. Each of the next ten TCP messages are processed by the PAM application 202 in the same manner as described above.

According to another aspect, an aggregation module 218 aggregates messages received from the source device 104 into a single aggregate message, such as an A-MPDU message. In one embodiment, the number of TCP messages aggregated into the A-MPDU message is limited, for example, by a predetermined maximum length (e.g., 65536 bytes).

The transmission module 208 transmits the aggregate message to a wireless station device. For example, the transmission module 202 may transmit the aggregate message to the particular the wireless station 106A based on the destination data, such as a destination address, within each of the TCP messages in the aggregate message.

According to another aspect, the proxy generation module 210 generates a proxy ACK message for a particular TCP message within an aggregate message when a MAC layer acknowledgement corresponding to that particular TCP message is received from the wireless station 106A. The proxy generation module 210 compares data included in a MAC ACK message received from the particular wireless station 106A to the TCP messages included in the aggregate records 220 stored in the buffer 214 to identify a matching TCP message. The proxy generation module 210 then generates a proxy ACK message corresponding to the identified TCP message with matching data.

The storage module 212 stores aggregate records (1-N) 220 in the buffer 214. Each aggregate record 220 includes a TCP message and identifies the particular aggregate message in which that TCP message was aggregated by the aggregation module 218.

The ACK message management module 216 detects holes in the TCP ACKs that correspond to TCP messages that have been aggregated into an aggregate message and limits the number of additional TCP messages that can be sent to the AP 102 from the source device 104 based on the maximum storage space minus the number of TCP messages already buffered. For example, the ACK message management module 216 determines the available memory for aggregate records, such as the current number of available slots in the buffer 214. As described above, each aggregate record includes a TCP message and identifies the particular aggregate message in which that TCP message was aggregated. In this case, the current number of available slots corresponds to the buffer limit minus the sum of the number of aggregate records (i.e., TCP messages) currently stored in the buffer 214. The ACK message management module 216 instructs the source device 104 to limit the number of additional TCP messages based on the available storage space data.

FIGS. 3A-3B

Figure 3A:
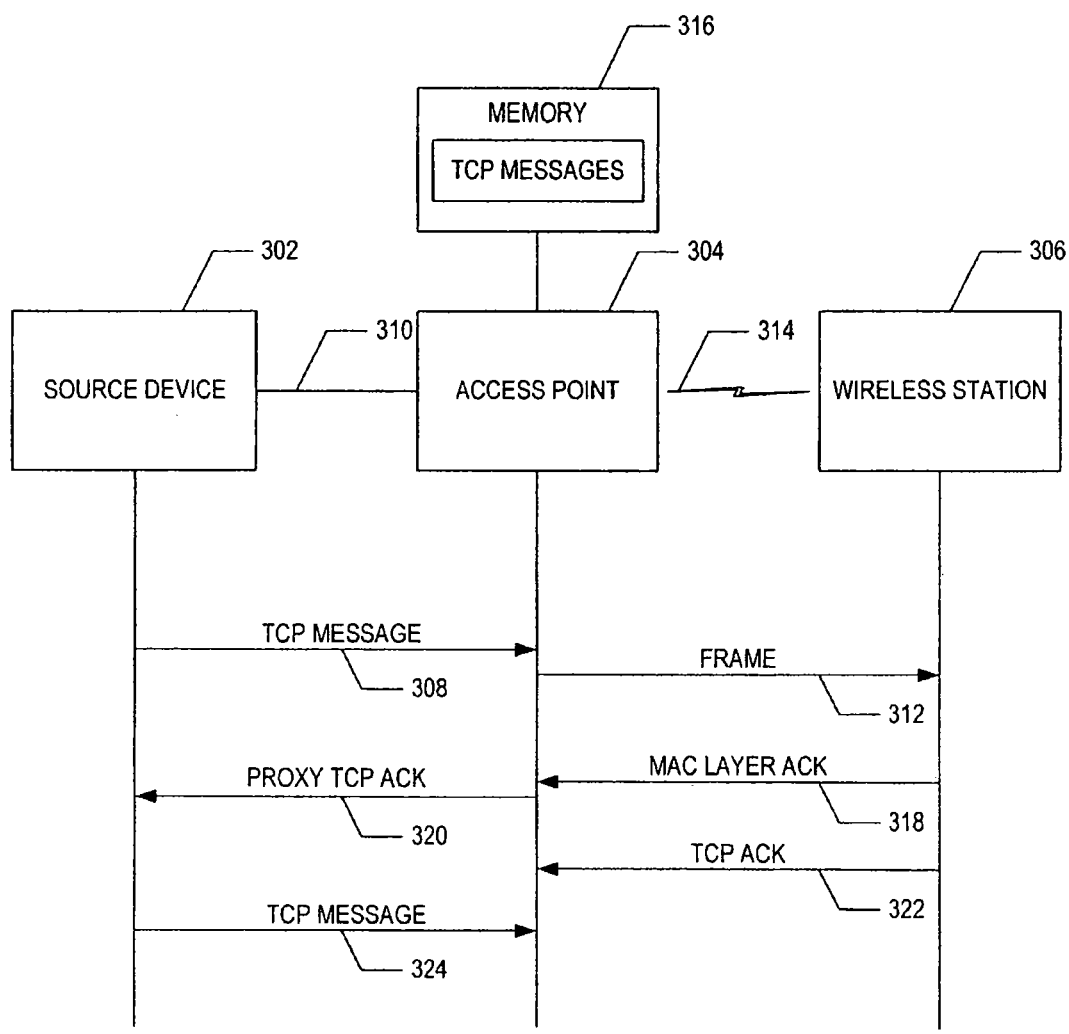
FIGS. 3A-3B illustrate communications between a source device, an access point, and a wireless station according to aspects of a wireless communication management system.
Figure 3B:
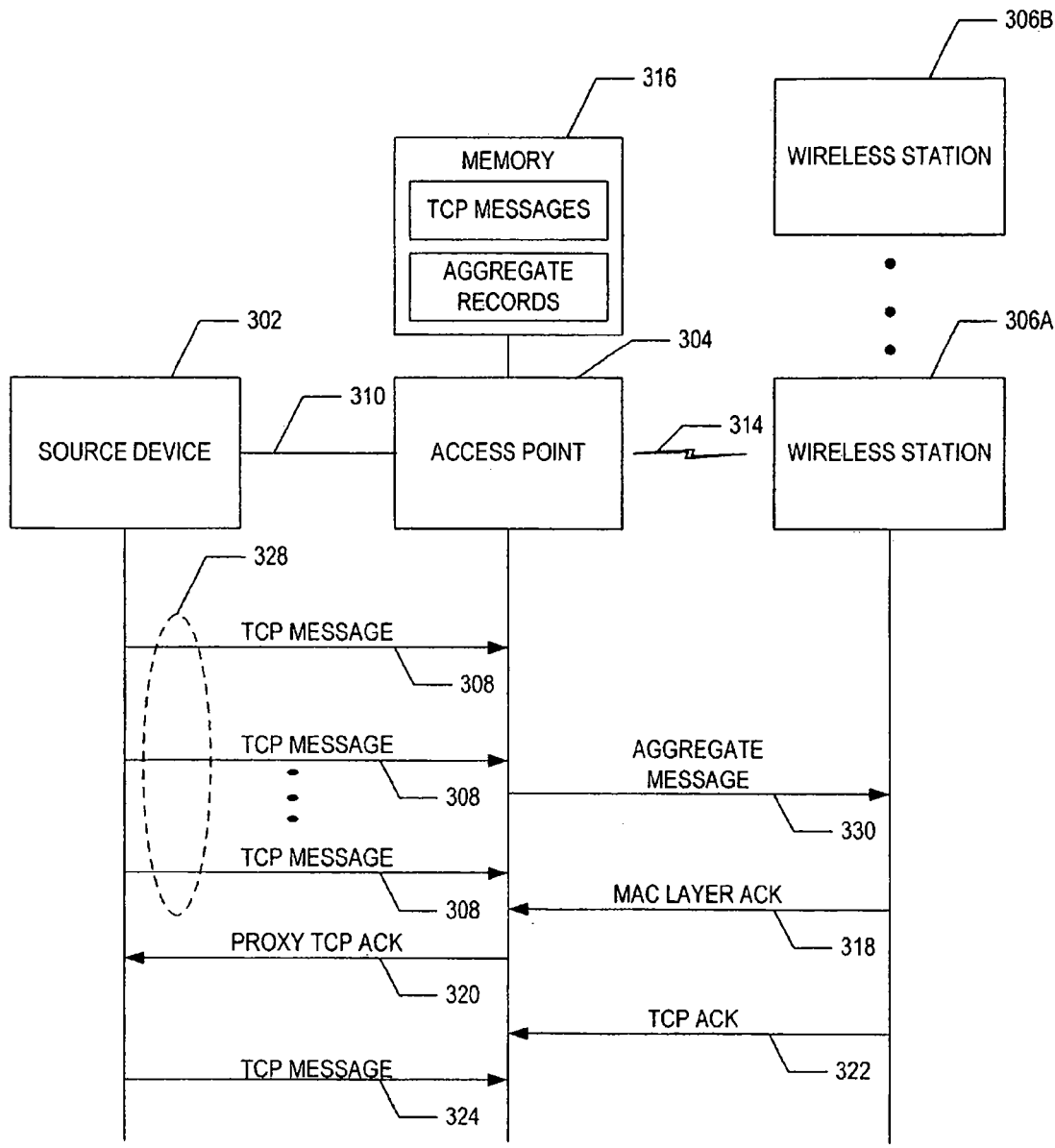

FIGS. 3A-3B illustrate communications between a source device, an access point, and a wireless station according to aspects of a wireless communication management system.

FIG. 3A illustrates the transmission of messages between a source device 302, an access point 304, and a wireless station 306. The source device 302 transmits a TCP message 308 to the access point 304 over a wireline network 310. The access point 304 formats the TCP message 308 for transmission to the wireless station 306 over a wireless link 314. For example, the access point 304 transmits a frame 312 encapsulating the TCP message 308 to the wireless station 306 over the wireless link 314. The access point 304 then stores a copy of the TCP message 308 in memory 316. The access point 304 stores a maximum number of TCP messages in the memory 316.

If the wireless station 306 successfully receives a frame 312 for a particular TCP message, the wireless station 306 transmits a corresponding MAC layer ACK 318 to the access point 304 via the wireless link 314. The access point 304 determines a current number (CN) of TCP messages stored in the memory 316, generates a proxy TCP ACK 320 in response to the MAC layer ACK 318. and transmits the proxy TCP ACK 320 over the wireline network 310 to the source device 302. According to another aspect, the access point 304 generates the proxy TCP ACK 320 in response to the TCP message 308. The wireless station 306 eventually transmits a TCP ACK 322 to the access point 304 and the copy of the TCP message 308 is cleared from the memory 316.

The proxy TCP ACK 320 includes available storage space data. In one example, the proxy TCP ACK 320 includes the number of additional messages that can be stored in the memory 316. In another example, the proxy TCP ACK 320 includes a total size, such as total byte size, for one or more additional messages that can be stored in the memory 316. Other examples exist.

The source device 302 limits the number of additional TCP messages it sends to the AP 304 based on the available storage space data included in the proxy TCP ACK 320. For example, according to one aspect, the current number of available slots corresponds to the memory limit minus the number of TCP messages currently stored in the memory 316. Therefore, the available storage space data indicates a total number of messages the source device 302 can send to the access point 304. The total number of messages can be determined based on the total size (e.g., byte size) of one or more additional messages or the total number of messages. The source device 302 transmits another TCP message 324, if storage space is available in the memory 316, to the access point 304 over the wireline network 310 in response to the proxy TCP ACK 320.

FIG. 3B illustrates the transmission of messages between the source device 302, the access point 304, and multiple wireless stations 306A and 306B. The source device 302 transmits multiple TCP messages 308, as indicated by reference character 328, to the access point 304 over the wireline network 310. The TCP messages 308 can be sent one at a time over a period, at the same time, or with some of the messages at one time and one or more other messages at one or more other times. The access point 304 aggregates the multiple TCP messages 308 received from the source device 302 into a single aggregate message 330. The single aggregate message 330 is, for example, an A-MPDU message according to the IEEE 802.11n protocol. The single aggregate message 330 is transmitted one of the wireless stations 306A, 306B.

The access point 304 stores an aggregate record in the memory 316 for each TCP message 308 in the aggregate message 330 that has been transmitted to the wireless stations 306A and 306B. Each TCP message 308 in the aggregate message 330 includes header data, such as a source device address, a wireless station address, or other data that identifies a corresponding TCP message 308.

A particular wireless station 306A receives the aggregate message 330. Each wireless station 306A or 306B has a destination address. The particular wireless station 306A will generate a corresponding MAC layer ACK 318 for a particular TCP message included in the aggregate message 330 if matching destination data is included in that particular TCP message. The particular wireless station 306A transmits the corresponding MAC layer ACK 318 to the access point 304 via the wireless link 314.

The access point 304 generates a proxy TCP ACK 320 in response to the corresponding MAC layer ACK 318. For example, the access point 304 identifies an aggregate record for a particular TCP message 308 with data that matches data included in the corresponding MAC layer ACK 318. The access point 304 then generates the proxy TCP ACK 320 that corresponds to the particular TCP message 308 and transmits the proxy TCP ACK over the wireline network 310 to the source device 302. Thus, for TCP messages 308 passing through the access point 304 to wireless stations 306A, 306B, the access point 304 will only send a proxy TCP ACK 320 to the source device 302 when it receives the correct MAC ACK indicating that the corresponding TCP message was received without error at the particular one of the wireless stations 306A, 306B.

The particular one of the wireless stations 306A, 306B that successfully receives a particular TCP message 308 included in the aggregate message 330 eventually transmits a corresponding TCP ACK 322 to the access point 304. As described above, the proxy TCP ACK 320 sent from the access point 304 to the source device 302 includes available storage space data. The source device 104 limits the number of additional TCP messages it sends to the AP 102 based on the available storage space data included in the proxy TCP ACK 320. For example, the source device 302 transmits at least one other TCP message 324, if storage space is available in the memory 316 of the access point 304, to the access point 304 over the wireline network 310 in response to the proxy TCP ACK 320.

Referring again to FIG. 2, the AP 102 typically has at least some form of computer readable media 206. Computer readable media 206, which include both volatile and nonvolatile media, removable and non-removable media, may be any available medium that may be accessed by the AP 102. By way of example and not limitation, computer readable media 206 comprise computer storage media and communication media. Computer storage media include volatile and nonvolatile media and removable and non-removable media implemented in any method or technology for storage of information, such as computer readable instructions, data structures, program modules, or other data. Communication media typically embody computer readable instructions, data structures, program modules, or other data in a modulated data signal, such as a carrier wave or other transport mechanism, and include any information delivery media.

Those skilled in the art will appreciate that variations from the specific embodiments disclosed above are contemplated by the invention. The invention should not be restricted to the above embodiments, but should be measured by the following claims. Combinations of any of the above are also included within the scope of computer readable media.

What is claimed is:

1. A computer-implemented method for communicating messages between a source device and at least one wireless station using an access point, comprising:
   receiving a message at an the access point from a source device;
   transmitting the message from the access point to the wireless station;
   storing a copy of the message transmitted to a wireless station in a memory at the access point;
   receiving a first acknowledgement message at the access point from the wireless station responsive to the message being successfully received at the wireless station at a lower layer of a protocol;
   transmitting a proxy acknowledgment message corresponding to a higher layer of a protocol from the access point to the source device responsive to the first acknowledgment message;
   responsive to receiving a second acknowledgment message at the access point from the wireless station for the message being successfully received at the wireless station at a higher layer of a protocol, suppressing retransmission of the second acknowledgement message from the access point to the source device and deleting the stored copy of the message; and
   responsive to not receiving the second acknowledgement message, retransmitting the copy of the message from the access point to the wireless station.

2. The method of claim 1, wherein the first acknowledgment message comprises a MAC layer acknowledgment message and the lower layer protocol comprises a MAC layer protocol.

3. The method of claim 1, wherein the second acknowledgment message comprises a TCP layer acknowledgment message and the higher layer protocol comprises a TCP layer protocol.

4. The method of claim 1, wherein suppressing retransmission of the second acknowledgement message occurs without handshaking between the access point and the wireless device.

5. The method of claim 1, wherein the source device refrains from sending additional messages until proxy acknowledgment messages are received for at least a portion of previously sent messages.

6. The method of claim 1, wherein the source device refrains from sending additional messages until proxy acknowledgment messages are received for at least a portion of previously sent messages.

7. A computer-implemented method for communicating messages between a source device and at least one wireless station using an access point, comprising:
   receiving a message at an the access point to the wireless station;
   transmitting the message from the access point to the wireless station;
   receiving a first acknowledgement message at the access point from the wireless station responsive to the message being successfully received at the wireless station at a lower layer of a protocol;
   receiving a second acknowledgement message at the access point from the wireless station responsive to the message being successfully received at the wireless station at a lower layer of a protocol;
   in a fast proxy generation mode, transmitting a proxy acknowledgment message from the access point to the source device responsive to the first acknowledgment message and prior to receiving the second acknowledgment message;
   in a delayed proxy generation mode, transmitting the second acknowledgment message from the access point to the source device responsive to the first and second acknowledgment messages; and
   switching from the fast proxy generation mode to the delayed proxy generation mode responsive to detecting an upcoming handoff of the wireless device from the access point to another access point.

8. The method of claim 7, further comprising:

aggregating the message with a plurality of messages, wherein transmitting the message comprises transmitting the aggregated messages as a single message from the access point to the wireless device.

9. The method of claim 7, wherein the fast proxy generation mode is a default mode.

10. The method of claim 7, wherein detecting an upcoming handoff of the wireless device comprises receiving a notification from a controller of the upcoming handoff, wherein the controller is in communication with a plurality of access points which includes the access point.

11. The method of claim 10, wherein the controller determines that another access point has a higher RSSI relative to the wireless device than the access point.

12. A computer-implemented method for communicating messages between a source device and at least one wireless station using an access point, comprising:

receiving a message at an the access point to the wireless station;

transmitting the message from the access point to the wireless station;

storing a copy of the message transmitted to the wireless station in a memory at the access point, the memory having a storage capacity;

receiving a first acknowledgement at the access point from the wireless station responsive to the message being successfully received at the wireless station at a lower layer of a protocol;

receiving a second acknowledgement at the access point from the wireless station responsive to the message being successfully received at the wireless station at a higher layer of the protocol;

responsive to the memory having available storage capacity, transmitting a proxy acknowledgment message corresponding to a higher layer of a protocol from the access point to the source device after receiving the first acknowledgment message and prior to receiving the second acknowledgment message; and responsive to the memory having limited available storage capacity, suppressing retransmission of the second acknowledgement message from the access point to the source device, after receiving the first and second acknowledgment messages.

13. The method of claim 12, further comprising:

determining an amount of available storage in the memory, wherein the proxy acknowledgment message comprises data relating to the amount of available storage.

14. The method of claim 13, wherein the source device sends an amount of messages corresponding to the amount of available storage in the memory of the access point.

15. The method of claim 12, wherein the source device refrains from sending additional messages until proxy acknowledgment messages are received for at least a portion of previously sent messages.

* * * * *